(12) United States Patent
Tremaine

(10) Patent No.: US 11,649,855 B1
(45) Date of Patent: May 16, 2023

(54) CONTAMINANT-FREE WORK PIECE PROCESSING SYSTEM

(71) Applicant: SKF CANADA LIMITED, Scarborough (CA)

(72) Inventor: Daren Paul Tremaine, Silverton (CA)

(73) Assignee: SKF CANADA LIMITED, Scarborough (CA)

( * ) Notice: Subject to any disclaimer, the term of this patent is extended or adjusted under 35 U.S.C. 154(b) by 0 days.

(21) Appl. No.: 17/731,476

(22) Filed: Apr. 28, 2022

(51) Int. Cl.
*F16C 32/04* (2006.01)

(52) U.S. Cl.
CPC ........ *F16C 32/0474* (2013.01); *F16C 32/047* (2013.01); *F16C 32/0446* (2013.01); *F16C 2380/26* (2013.01)

(58) Field of Classification Search
CPC .............. F16C 32/0474; F16C 32/0446; F16C 32/047; F16C 2380/26; F16C 32/044; F16C 2380/18; F16C 32/0406; F16C 32/0461; F16C 32/0476; F16C 32/0489; H02K 7/09
USPC ........................ 310/90.5, 12.04, 12.05, 12.06
See application file for complete search history.

(56) References Cited

U.S. PATENT DOCUMENTS

| | | | |
|---|---|---|---|
| 6,653,756 B2 | 11/2003 | Ueyama et al. | |
| 6,777,833 B1 * | 8/2004 | Williams | H02K 41/03 310/90.5 |
| 6,800,833 B2 * | 10/2004 | Gregor | C30B 31/14 219/390 |
| 7,812,286 B2 | 10/2010 | Sorabji et al. | |
| 8,111,978 B2 | 2/2012 | Sorabji et al. | |
| 8,658,947 B2 | 2/2014 | Sorabji et al. | |
| 8,659,205 B2 | 2/2014 | Moura et al. | |
| 8,680,803 B2 | 3/2014 | Krupyshev et al. | |
| 8,900,889 B2 * | 12/2014 | Sorabji | H01L 21/6835 257/E21.529 |
| 9,024,488 B2 | 5/2015 | Gilchrist et al. | |
| 9,209,049 B2 | 12/2015 | Sorabji et al. | |
| 9,390,950 B2 | 7/2016 | Sorabji et al. | |
| 9,564,349 B2 | 2/2017 | Sorabji et al. | |
| 11,209,046 B2 | 12/2021 | Vikman et al. | |
| 2008/0090393 A1 | 4/2008 | Aderhold et al. | |
| 2008/0142497 A1 * | 6/2008 | Sorabji | H01L 21/67109 219/393 |
| 2008/0169282 A1 | 7/2008 | Sorabji et al. | |
| 2009/0243413 A1 * | 10/2009 | Gilchrist | H02K 29/03 310/90.5 |

* cited by examiner

*Primary Examiner* — Ahmed Elnakib
(74) *Attorney, Agent, or Firm* — J-Tek Law PLLC; Scott T. Wakeman; Mark A. Ussai

(57) ABSTRACT

A processing system includes a housing having an interior chamber and a central vertical axis extending through the interior chamber. A rotor is disposed within the housing interior chamber and is configured to support one or more work pieces. At least one lift actuator is configured to linearly displace the rotor along the central vertical axis between a lower, inactive vertical position and an upper, transfer vertical position. At least one levitation actuator is spaced above the rotor and is configured to exert a magnetic pulling force on the rotor to levitate the rotor upwardly from the transfer vertical position to a working vertical position. Further, an annular stator assembly is coupled with the housing, is disposed about and spaced radially outwardly from the rotor and includes a motor stator, the at least one lift actuator being configured to vertically displace the rotor relative to the stator assembly.

20 Claims, 11 Drawing Sheets

CONTAMINANT-FREE WORK PIECE PROCESSING SYSTEM

BACKGROUND OF THE INVENTION

The present invention relates to magnetic actuators, and more particularly to magnetic actuators and bearings used to contactlessly levitate and rotate components of processing systems.

Systems for processing sensitive work pieces in a substantially contamination free environment, such as substrates for integrated circuits, are known and typically include a working chamber that is hermetically sealable to avoid contamination. Such systems may be driven by magnetic actuators and bearings for rotating and linearly displacing one or more members used to support the work pieces during a processing operation. Such magnetic actuators and magnetic bearings contactlessly move or displace these support members, which avoids the necessity of lubricants and eliminates sliding contact between components, which can generate debris, both of which may contaminate the working chamber.

SUMMARY OF THE INVENTION

In one aspect, the present invention is a processing system for processing at least one work piece, the processing system comprising a housing having an interior chamber and a central vertical axis extending through the interior chamber. A rotor is disposed within the interior chamber of the housing and is configured to support the at least one work piece. At least one lift actuator is configured to linearly displace the rotor along the central vertical axis between a lower, inactive vertical position and an upper, transfer vertical position. At least one levitation actuator is spaced above the rotor and is configured to exert a magnetic pulling force on the rotor to levitate the rotor upwardly from the transfer vertical position to a working vertical position. Further, an annular stator assembly is coupled with the housing, disposed about and spaced radially outwardly from the rotor and includes a motor stator, the at least one lift actuator being configured to vertically displace the rotor relative to the stator assembly.

In another aspect, the present invention is again a processing system for processing at least one work piece, the processing system comprising a housing having an interior chamber and a central vertical axis extending through the interior chamber. A rotor is disposed within the interior chamber of the housing and configured to support the at least one work piece. At least one lift actuator is spaced vertically below the rotor and has a movable output member contactable with the rotor and is configured to linearly displace the rotor along the central vertical axis between a lower, inactive vertical position and an upper, transfer vertical position. At least one levitation actuator is disposed above the rotor and is configured to exert a magnetic pulling force on the rotor to levitate the rotor upwardly from the transfer vertical position to a working vertical position. Further, an annular stator assembly is disposed about and spaced radially outwardly from the rotor and includes a motor stator configured to exert magnetic torque on the rotor when the rotor is at the working vertical position. As such, the rotor angularly displaces about the central vertical axis while the at least one levitation actuator maintains the rotor at the working vertical position.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
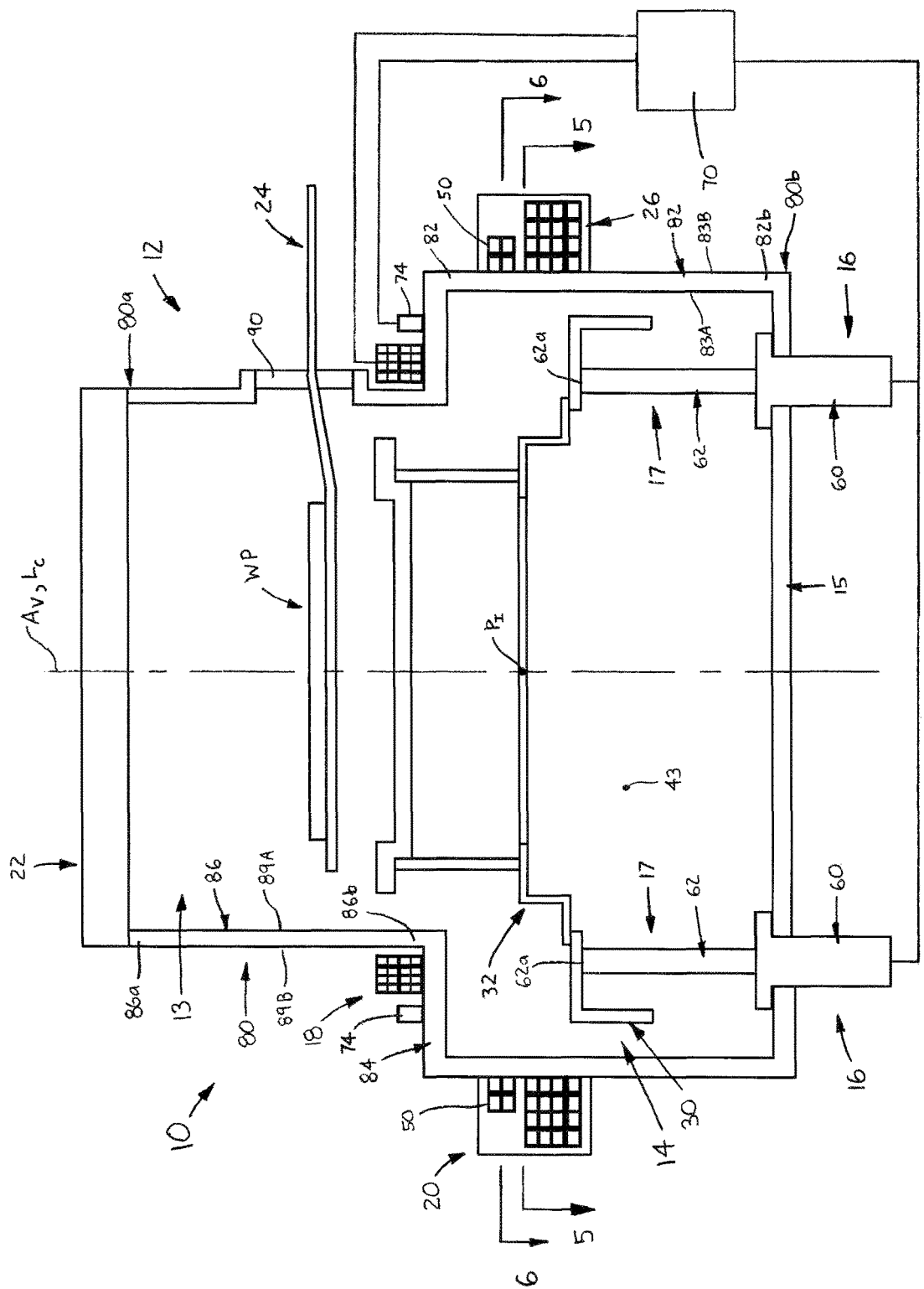
FIG. 1 is an axial cross-sectional view of a processing system in accordance with the present invention, shown with a rotor in an inactive position.

Certain terminology is used in the following description for convenience only and is not limiting. The words "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-12 a processing system 10 for processing at least one work piece WP. The one or more work pieces WP are each preferably a substrate for integrated circuits, but may be any other component or assembly in which processing must be performed in a substantially contaminant free environment, as discussed in further detail below. Basically, the processing system 10 comprises a housing 12, a rotor 14, at least one lift actuator 16, at least one levitation actuator 18, an annular stator assembly 20, a processing tool 22 and a loader/unloader arm 24 (FIG. 1). The housing 12 is preferably hermetically sealable and the rotor 14 is levitated and contactlessly rotated such the one or more work pieces WP is/are processed in a substantially contaminant-free environment.

More specifically, the housing 12 is generally cylindrical and has an interior chamber 13 and a central vertical axis $A_V$ extending through the chamber 13. The rotor 14 is disposed within the housing chamber 13 and is configured to support the at least one work piece WP. The at least one lift actuator 16 is disposed below the rotor 14, has a movable portion 17 contactable with the rotor 14, and is configured to linearly displace the rotor 14 along the central vertical axis $A_V$ between a lower, inactive vertical position $p_I$ (FIG. 1) and an upper, transfer vertical position $p_T$ (FIG. 2), and in particular is configured to linearly displace the rotor 14 relative to the stator assembly 20. Preferably, the lift actuator(s) 16 are attached to or/and disposed at least partially beneath the housing base wall 15, such that at least a portion of each actuator 16 extends through the base wall 15 and into the housing chamber 13. Further, the least one levitation actuator 18 is disposed above the rotor 14 (i.e., spaced vertically from so as to be located over the top surface of the rotor 14) and is preferably mounted on the housing 12. Each levitation actuator 18 is configured to exert a magnetic pulling force $F_M$ (FIG. 4) on the rotor 14 to levitate the rotor 14 upwardly from the transfer vertical position $p_T$ (FIG. 2) to a working vertical position $p_W$ (FIG. 3), and thereafter to maintain the rotor 14 at the working position $p_W$ during a processing operation.

Furthermore, the annular stator assembly 20 is disposed radially outwardly from and coupled with the housing 12, so as to thereby be disposed about (i.e., around or surrounding) and spaced radially outwardly from the rotor 14. The stator assembly 20 includes a motor stator 26 configured to exert magnetic torque on the rotor 14 when the rotor 14 is at the working vertical position $p_W$, as discussed in further detail below. As such, the rotor 14 angularly displaces about a vertical axis, either the central vertical axis $A_V$ or another axis (none shown) parallel to the central vertical axis $A_V$, while the at least one levitation actuator 18 maintains the rotor 14 at the working vertical position $p_W$.

While being levitated by the levitation actuator(s) 18 and angularly displaced by the motor stator 26, the processing tool 22 performs one or more processing operations on the at least one work piece WP. A wide variety of processing tools are known to those skilled in the art and may include tools for exposing the substrate to a variety of different gases, varying the pressure and temperature within the chamber 13, and different types of energy sources. Although depicted on the top of the housing 12, the tool 22 may be located anywhere within or on the housing 12, including being located below or beside the working piece WP, or in a combination of different locations.

After the particular processing operation is completed, the levitation actuator(s) 18 slowly lower the rotor 14 vertically downwardly from the working vertical position $p_W$ to the transfer vertical position $p_T$, and thus onto the one or more lift actuators 16. The lift actuator(s) 16 thereafter displace the rotor 14 vertically downwardly from the transfer position $p_T$ to the inactive vertical position $p_I$. As the rotor 14 displaces toward the inactive position $p_I$, the at least one work piece WP is transferred onto the loader/unloader arm 24, which is preferably a robotic arm, and the arm 24 is configured to remove the work piece(s) WP from the housing chamber 13. The loader/unloader arm 24 then inserts at least one other work piece WP into the housing chamber 13. The lift actuator(s) 16 then displace the rotor 14 from the inactive vertical position $p_I$ to the transfer vertical position $p_T$, during which displacement the other or new work piece(s) WP are transferred onto the rotor 14 for another processing operation. Having described the basic components and functions above, these and other elements of the present work piece processing system 10 are described in further detail below.

Figure 7:
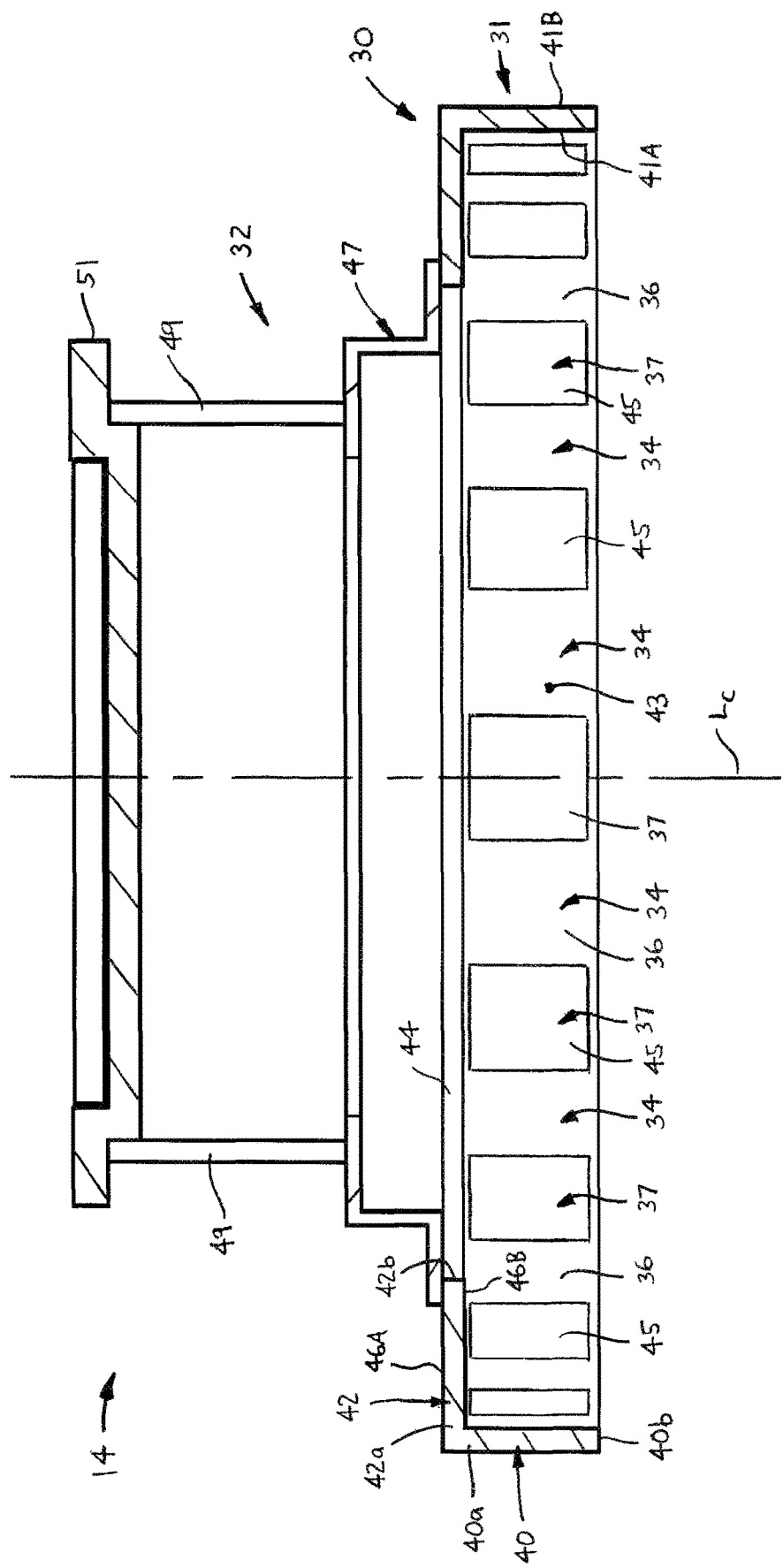
FIG. 7 is an axial cross-sectional view of the rotor.
Figure 8:
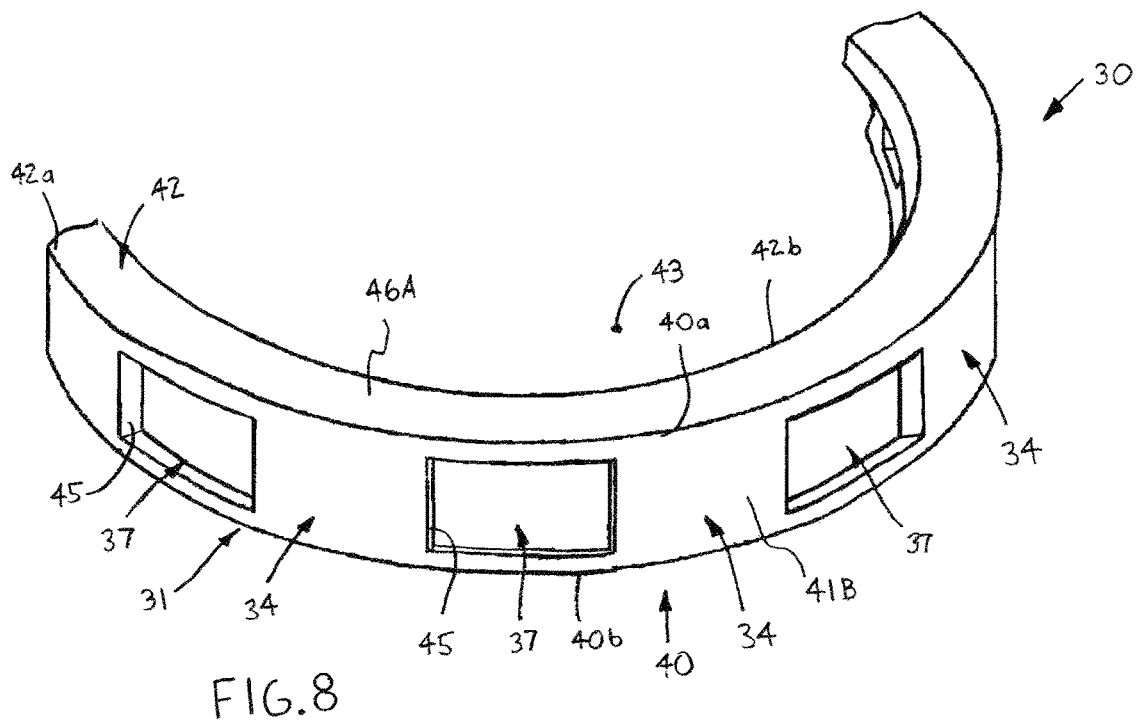
FIG. 8 is a perspective view of a presently preferred construction of the rotor.
Figure 9:
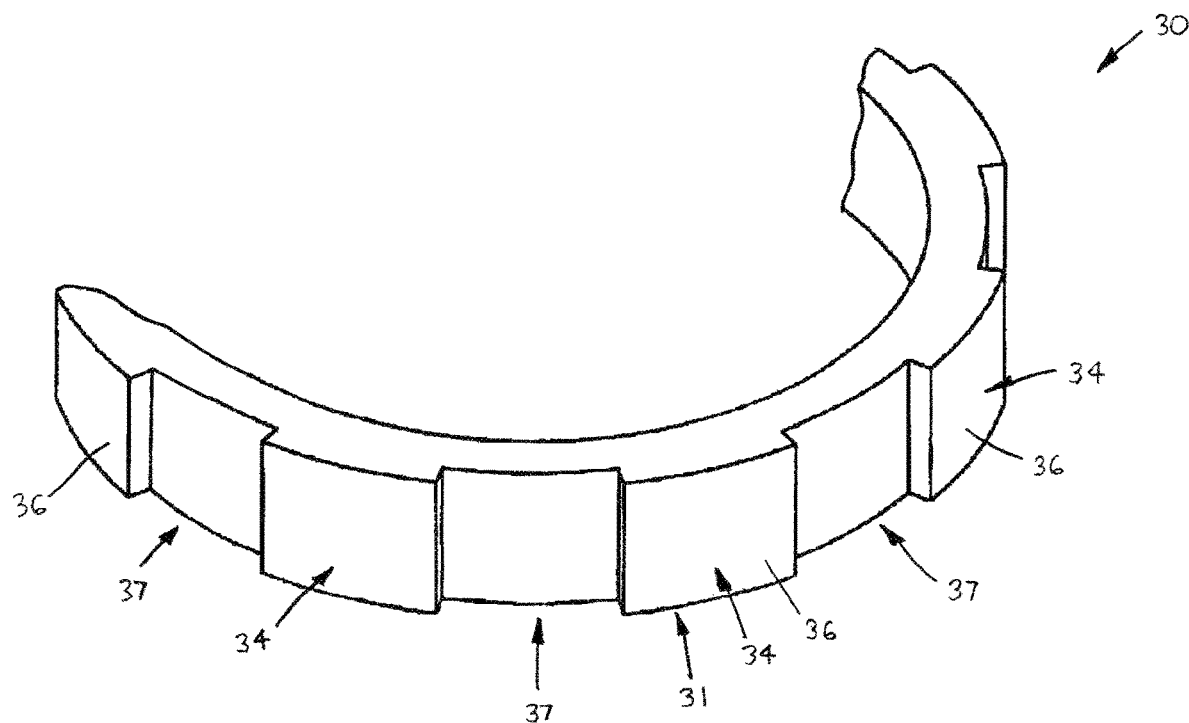
FIG. 9 is a broken-away, perspective view of an alternative construction of the rotor.
Figure 10:
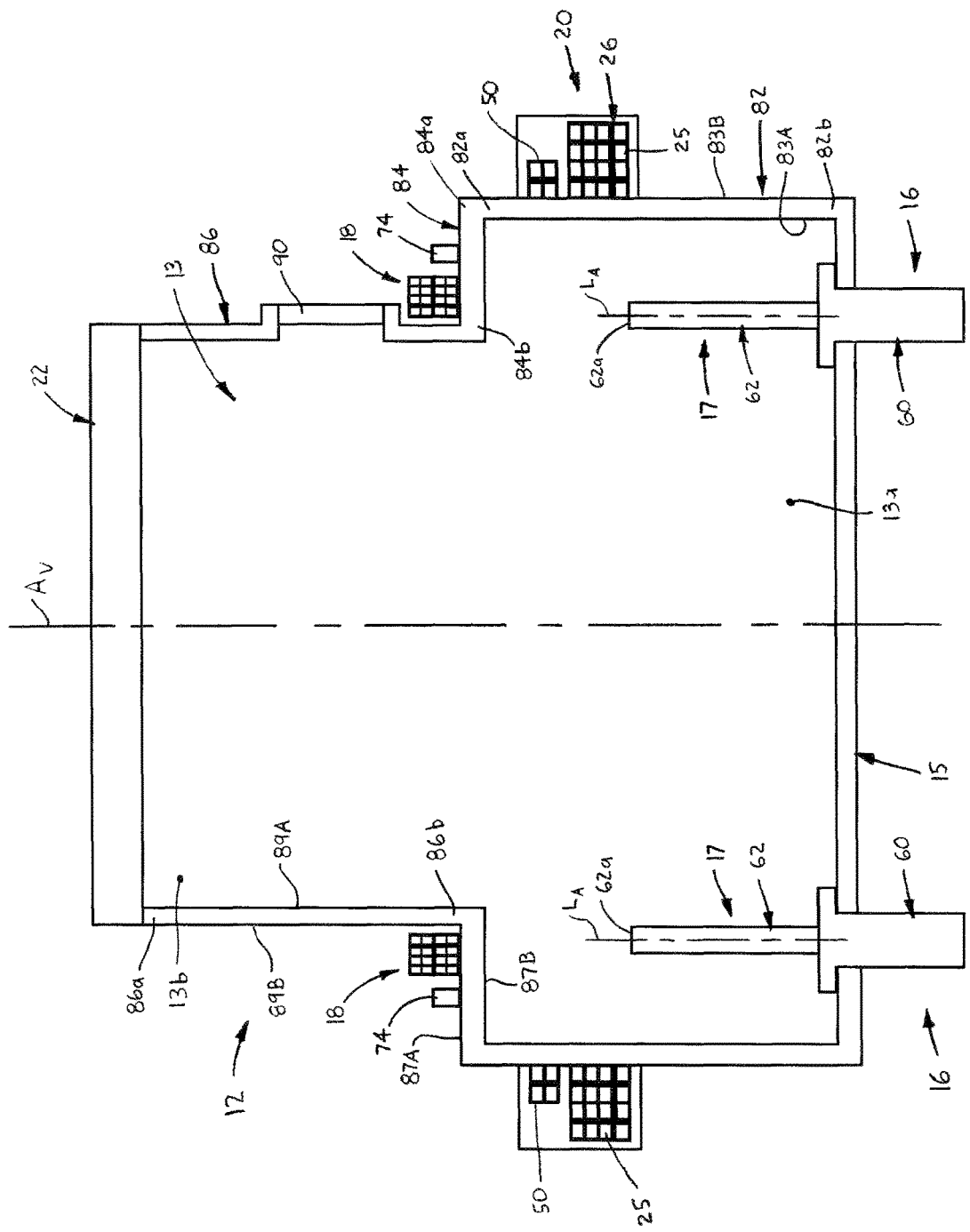
FIG. 10 is an axial view of a presently preferred construction of a housing.
Figure 11:
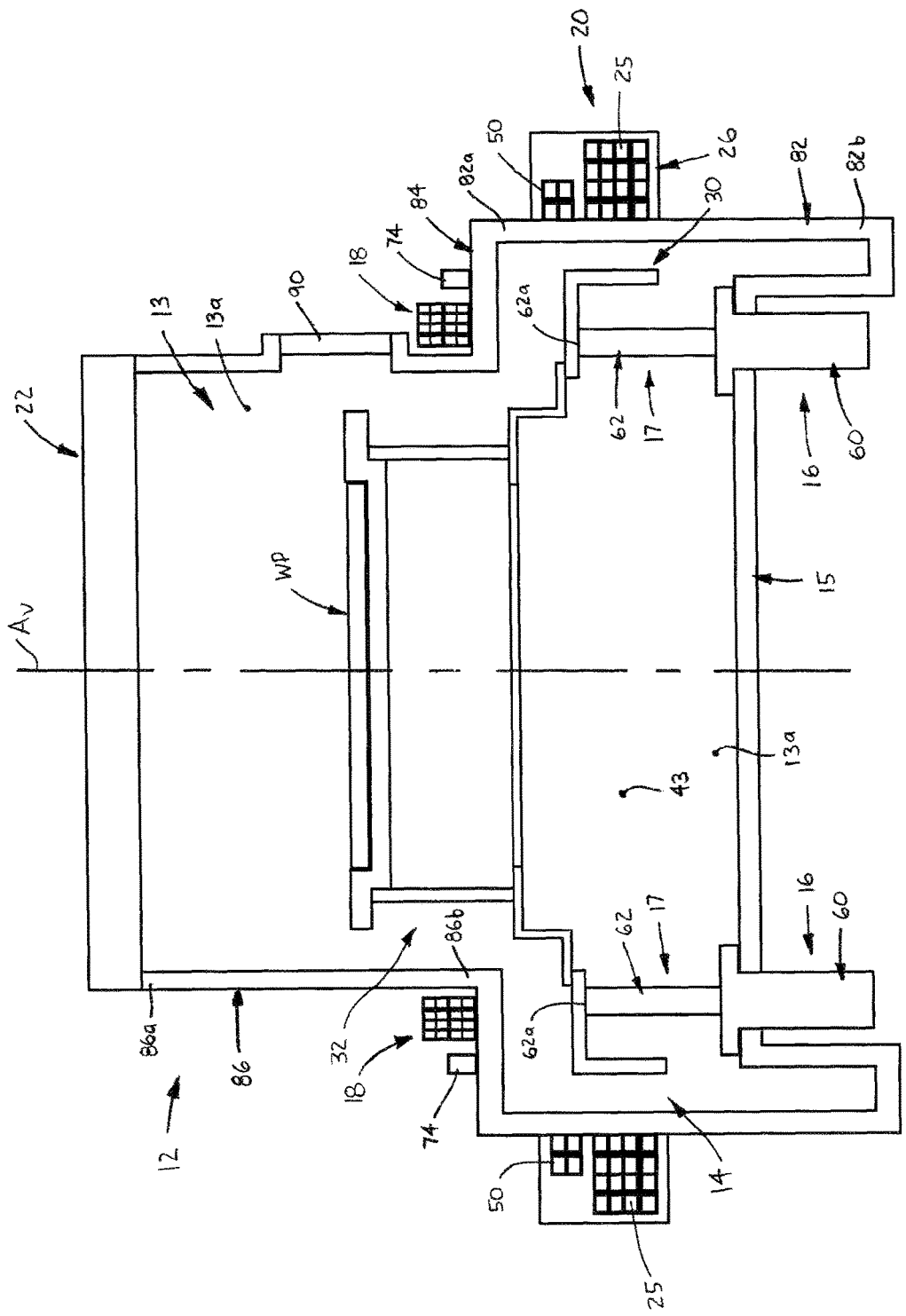
FIG. 11 is another axial cross-sectional view of the processing system, shown with an alternative construction of the housing.

Referring now to FIGS. 7-9, the rotor 14 preferably includes a circular base body 30 magnetically engageable by the motor stator 26 and a support 32 mounted to the circular base body 30 and configured to support the at least one work piece WP. The rotor base body 30 has a centerline $L_C$, which is coaxial with the central vertical axis $A_V$ of the housing 12, an outer perimeter 31 and a plurality of magnetic material sections 34 located at the outer perimeter 31 and spaced circumferentially apart about the centerline $L_C$. Each magnetic material section 34 is either an integral ferromagnetic portion of the rotor 14 spaced from each circumferentially adjacent magnetic section 34 by an air gap 37, as shown in FIGS. 7-9, or a permanent magnet attached to a remainder of the rotor 14 (structure not shown).

As shown in FIGS. 7 and 8, the base body 30 of the rotor 14 preferably includes a lower, circular tubular section 40 and an upper, radial flange section 42. The tubular section 40 has upper and lower axial ends 40a, 40b and inner and outer circumferential surfaces 41A, 41B, respectively, the inner surface 41A defining a central bore 43. Further, the tubular section 40 preferably has a plurality of circumferentially spaced openings 45 extending radially between the inner and outer circumferential surfaces 41A, 41B, such that each one of the plurality of magnetic material sections 34 is defined between each pair of adjacent openings 45, as shown in FIGS. 7 and 8. The flange section 42 has opposing upper and lower radial surfaces 46A, 46B, respectively, and extends radially inwardly from an outer radial end 42a integral with the upper end 40a of the tubular section 40 and an inner radial end 42b defining a central opening 44.

Referring specifically to FIG. 7, the support 32 is mounted to the radial flange section 42 of the base body 40, and is preferably disposed on the upper surface 46A of the flange section 42. The support 32 preferably includes an L-shaped annular rim 47, a plurality of support members 49 and a part holder 51.

Figure 12:
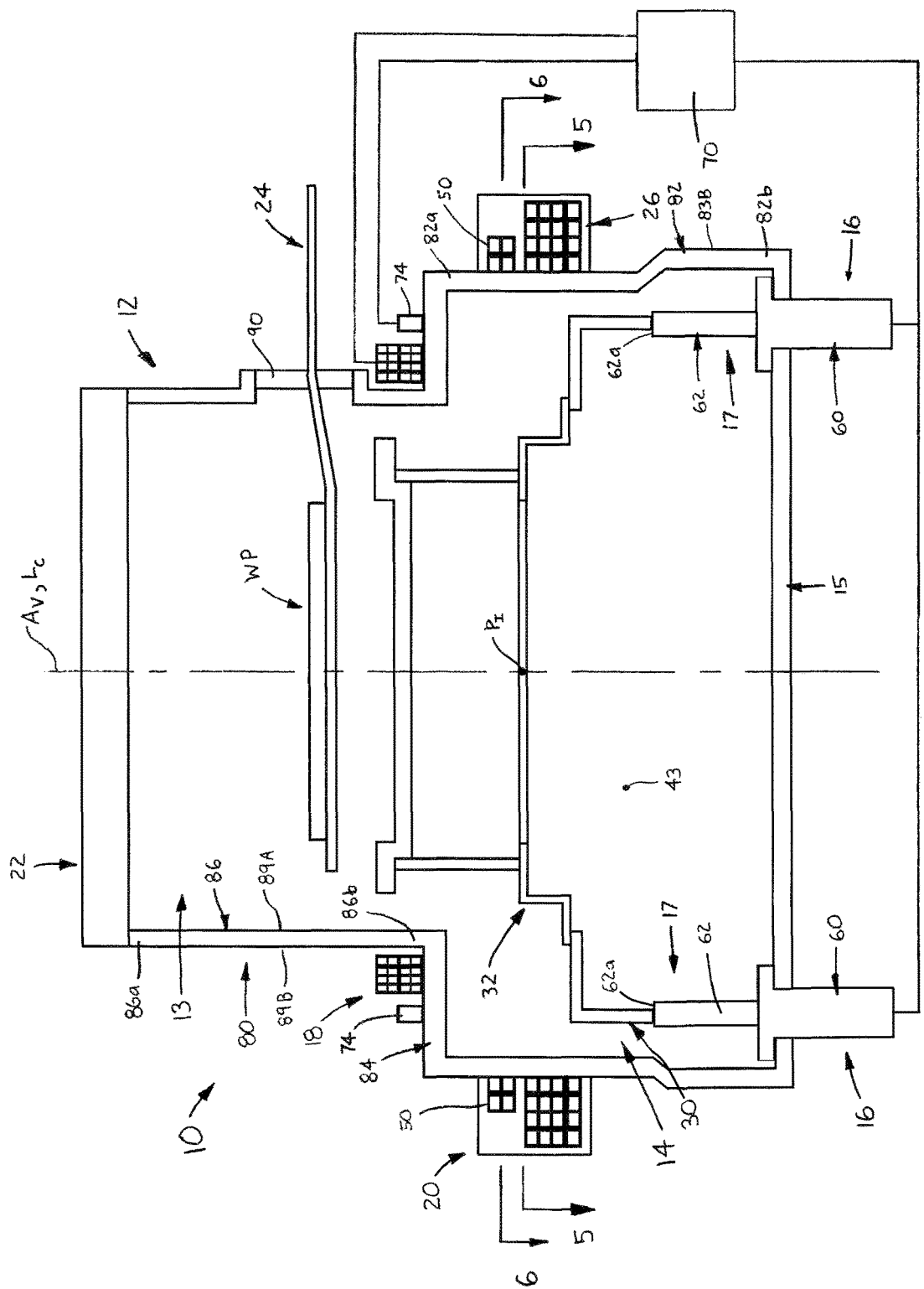
FIG. 12 is another axial cross-sectional view of the processing system, shown with yet another alternative construction of the housing and alternative positioning of the lift actuators.

With the preferred rotor construction described above, at least a portion of the at least one lift actuator 16 is preferably located within the bore 43 of the tubular section 40 of the rotor base body 30 and is positioned to contact the flange section 42, as shown in FIGS. 1-3 and 11 and discussed in further detail below. However, the rotor base body 30 and/or the rotor support 32 may be formed in any other appropriate manner, and the lift actuator(s) 16 positioned with respect thereto in any other location. For example, the rotor base body 30 may be formed as solid cylinder (not shown), or as a radially thicker ring as shown in FIG. 9, with a plurality of radially outwardly extending lugs 36 providing the magnetic material sections 34. With any of these structures, the one or more lift actuators 16 may be alternatively arranged to contact an axial end surface of the body 30, as shown in FIG. 12. Further for example, the rotor 14 may be formed as a solid circular or annular disk (not shown), such that each lift actuator 16 contacts a point on the lower radial surface of the disk. The scope of the present invention encompasses the structures of the rotor 14 as disclosed herein and any other construction which enables the processing assembly 10 to function as generally described herein.

Referring to FIGS. 1-5, with any rotor construction, the motor stator 26 is configured to exert magnetic force or torque on each of the magnetic material sections 34 of the rotor 14 to angularly displace the rotor 14 about the central vertical axis $A_V$. Although the construction and operation of electric motors are well known concepts, such that a detailed description is unnecessary for the purposes of the present disclosure, certain details of the preferred structure are provided herein for a clearer understanding of the presently preferred structure of various components of the present invention. Specifically, the motor stator 26 preferably includes a plurality of circumferentially spaced coils 25 receiving varying electric current, such that a magnetic field varies about the inner perimeter of the stator assembly 20 and exerts attractive and/or repulsive magnetic forces on each of the magnetic material sections 34 of the rotor 14.

Thereby, magnetic torque is continuously exerted on various sections about the perimeter of the rotor 14 while the varying current flows through the coils 25 to angularly displace the rotor 14 about the central vertical axis $A_V$. However, the motor stator 26 may be formed in any other appropriate manner, for example, the motor stator 26 may include one or more permanent magnets, etc. The present invention encompasses any structure of the motor stator 26 capable of magnetically rotating the rotor 16 and is in no manner limited to any particular construction.

Figure 5:
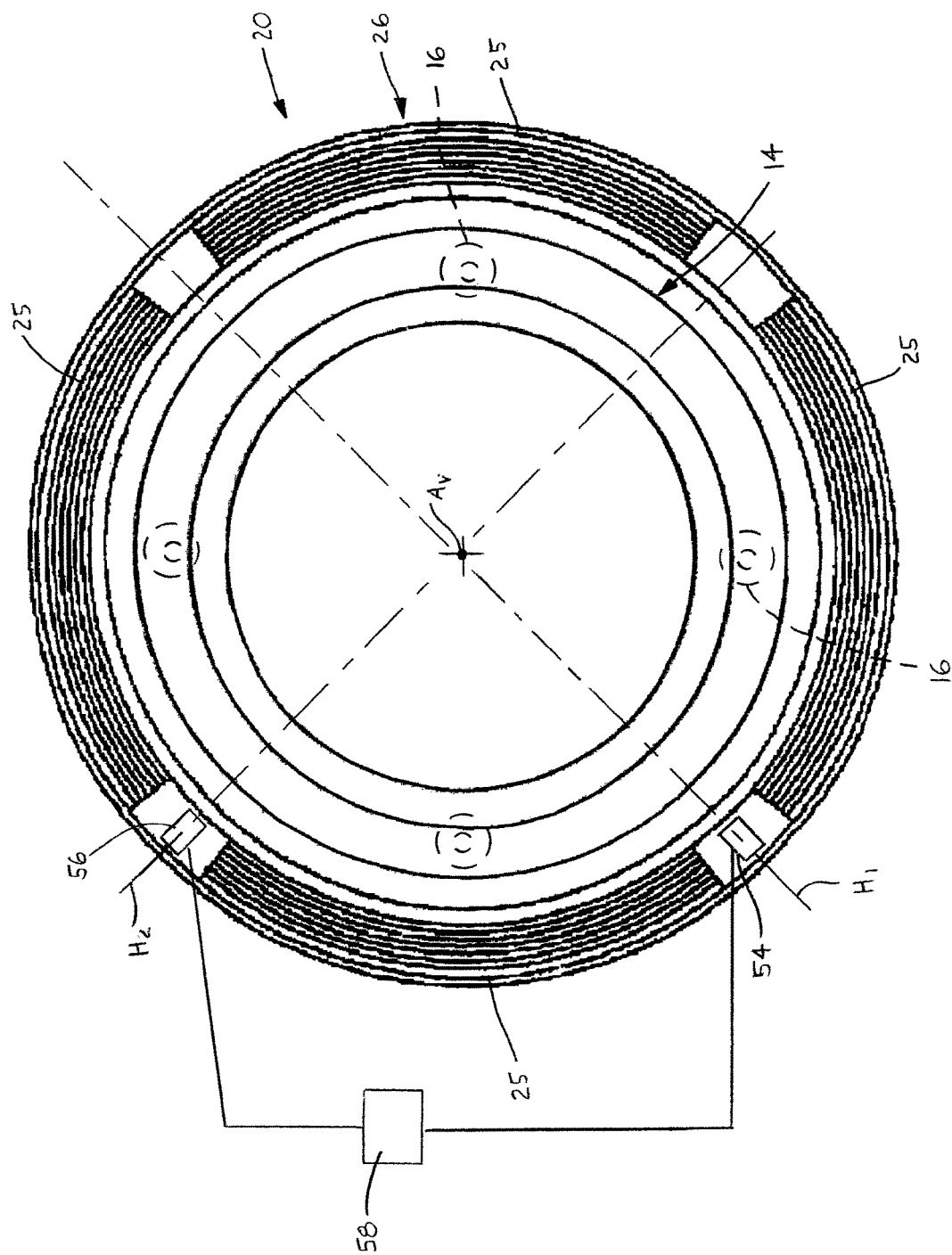
FIG. 5 is a view through line 5-5 of FIG. 1.
Figure 6:
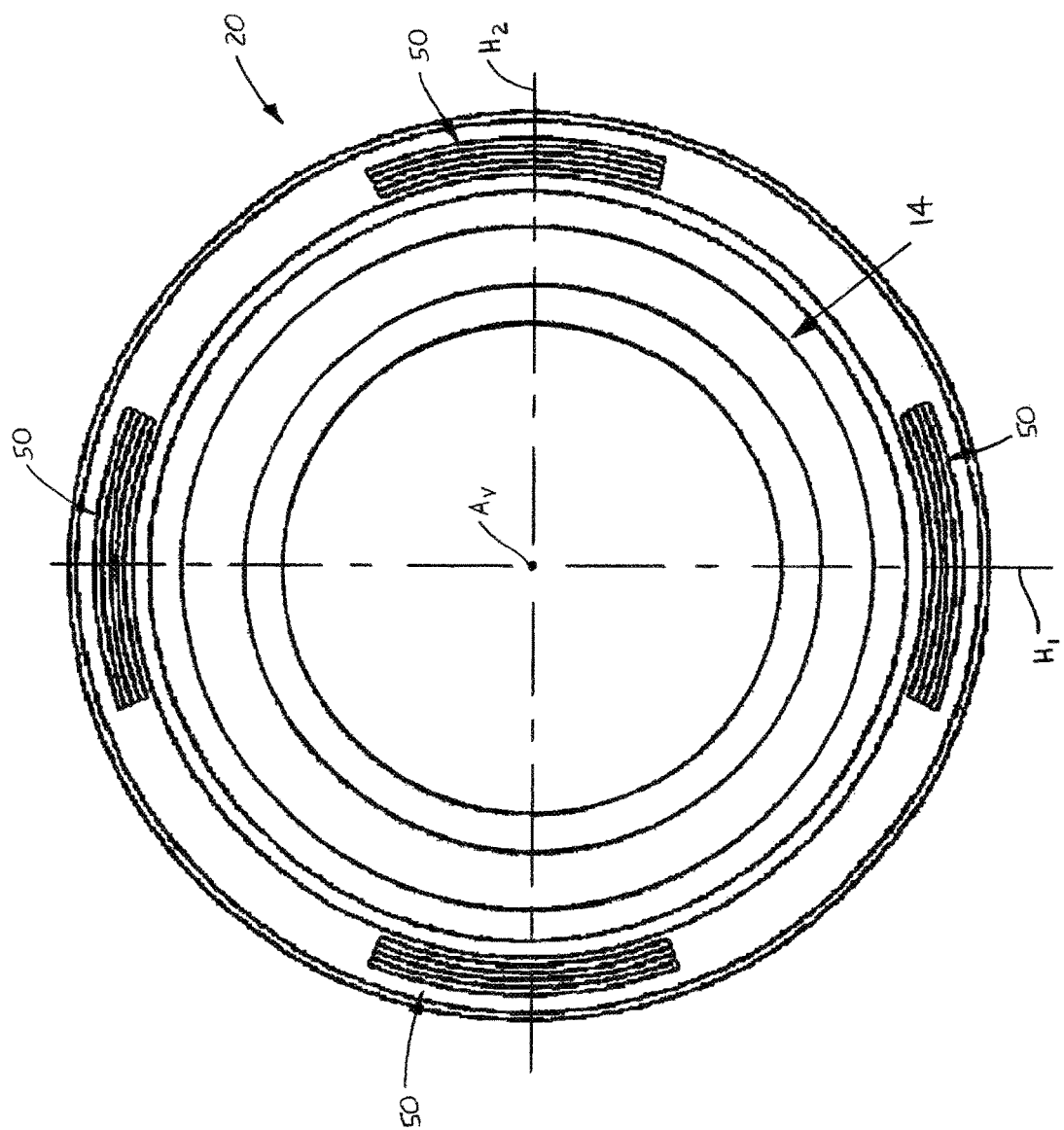
FIG. 6 is a view through line 6-6 of FIG. 1.

As best shown in FIG. 6, the stator assembly 20 preferably further includes at least three radial actuators 50 spaced apart circumferentially about the central axis $A_V$, four actuators 50 being depicted for convenience of illustration only. Each radial actuator 50 is configured to exert a magnetic force on the rotor 14 in a radial direction with respect to the central axis $A_V$. Referring particularly to FIG. 5, the processing system 10 preferably also comprises at least one first radial position sensor 54 configured to sense a position of the rotor 14 along a first horizontal axis $H_1$ and at least one second radial position sensor 56 configured to sense a position of the rotor 14 along a second horizontal axis $H_2$, the two axes $H_1$, $H_2$ being angularly spaced apart by any appropriate or desired angle, such as for example ninety degrees (90°), as depicted. A controller 58 is coupled with the at least one first radial position sensor 54, the at least one second radial position sensor 56 and the at least three radial actuators 50. The controller 58 is configured to operate the at least three radial actuators 50, based on position information from the sensors 54, 56, such that the rotor 14 remains centered about the central vertical axis $A_V$ or another vertical axis parallel to the central axis $A_V$ when the rotor 14 angularly displaces.

Referring now to FIGS. 1-3, 5, 10 and 11, the processing system 10 preferably includes at least three lift actuators 16 spaced circumferentially about the central axis $A_V$, for example three actuators 16 spaced 120° apart, four actuators 16 spaced 90° apart, etc. Each lift actuator 16 is preferably disposed at least partially within the bore 43 of the rotor 14 and positioned so as to contact the lower surface 46B of the rotor radial flange section 42 as described above. As such, the rotor 14 may either be supported on the lift actuators 16, or rest on the housing base wall 15 (requiring an extension of the actuators 16 to contact the rotor 14), when the rotor 14 is located at the inactive position $p_I$. However, the lift actuators 16 may alternatively be located entirely externally of the rotor 14, for example beneath a lower axial end 40b of the rotor 14 as depicted in FIG. 12, such that the rotor 14 rests upon the actuator(s) 16 in the inactive position $p_I$. Also, although a plurality of lift actuators 16 is presently preferred, the processing system 10 may include only a single lift actuator 16, for example located at the center of a solid rotor 16 (not shown).

Further, each of the one or more lift actuators 16 is preferably a conventional linear actuator and includes a base 60 and an output member 62 linearly displaceable relative to the base 60 along an actuator axis $L_A$ (FIG. 10), which is parallel to or colinear with the central vertical axis $A_V$. Each output member 62 provides the movable portion 17 of each actuator 16 and has an outer end 62a contactable with the rotor 14, such that linear displacement of the output member 62 vertically displaces the rotor 14 along the central vertical axis $A_V$. The lift actuator(s) 16 may be any known type of linear actuator or a specially manufactured device.

For example, each linear actuator 16 may be a solenoid, in which the base 60 includes a coil and the output member 62 is a plunger disposed within the coil, or a power screw in which the base includes a rotating screw and the output member 62 includes a nut threadably engaged with the screw, or conversely the base 60 may include a rotatable nut and the output member 62 is a linearly displacing screw. Further for example, each actuator 16 may be a hydraulic or pneumatic cylinder, in which the base 60 includes the cylinder barrel and the output member 62 includes the piston and piston rod, or a rack-and-pinion mechanism in which the base 60 includes a pinion and the output member 62 includes a rack. The lift actuator(s) 16 may be or include any one or more of the actuator types discussed above or any other type of linear actuator, and the present invention is not limited to any specific structure of the lift actuator 16.

Referring now to FIGS. 1-4 and 11, the processing system 10 preferably includes at least three levitation actuators 18 spaced circumferentially about the central axis $A_V$, for example three actuators spaced 120° apart, four actuators 18 spaced 90° apart, etc. Each levitation actuator 18 is preferably mounted on a radial section 84 of a cylindrical body 80 of the housing 12, as described in detail below, so as to be spaced axially and vertically above the rotor 14. However, the levitation actuators 18 may be otherwise disposed on or within the housing 12 or mounted to a bracket or other device (none shown) configured to position the actuator(s) vertically above the rotor 14. Further, each levitation actuator 18 is preferably an axial electromagnet configured to exert an upwardly-directed magnetic pulling force $F_M$ (FIG. 4) on the rotor 14, but may be used in combination with one or more permanent magnets. Being electromagnets, the levitation actuators 18 may be activated to levitate the rotor 14, and displace the rotor 14 vertically upwardly, and alternatively deactivated to allow the rotor 14 to displace vertically downwardly, as discussed above and in further detail below.

Figure 2:
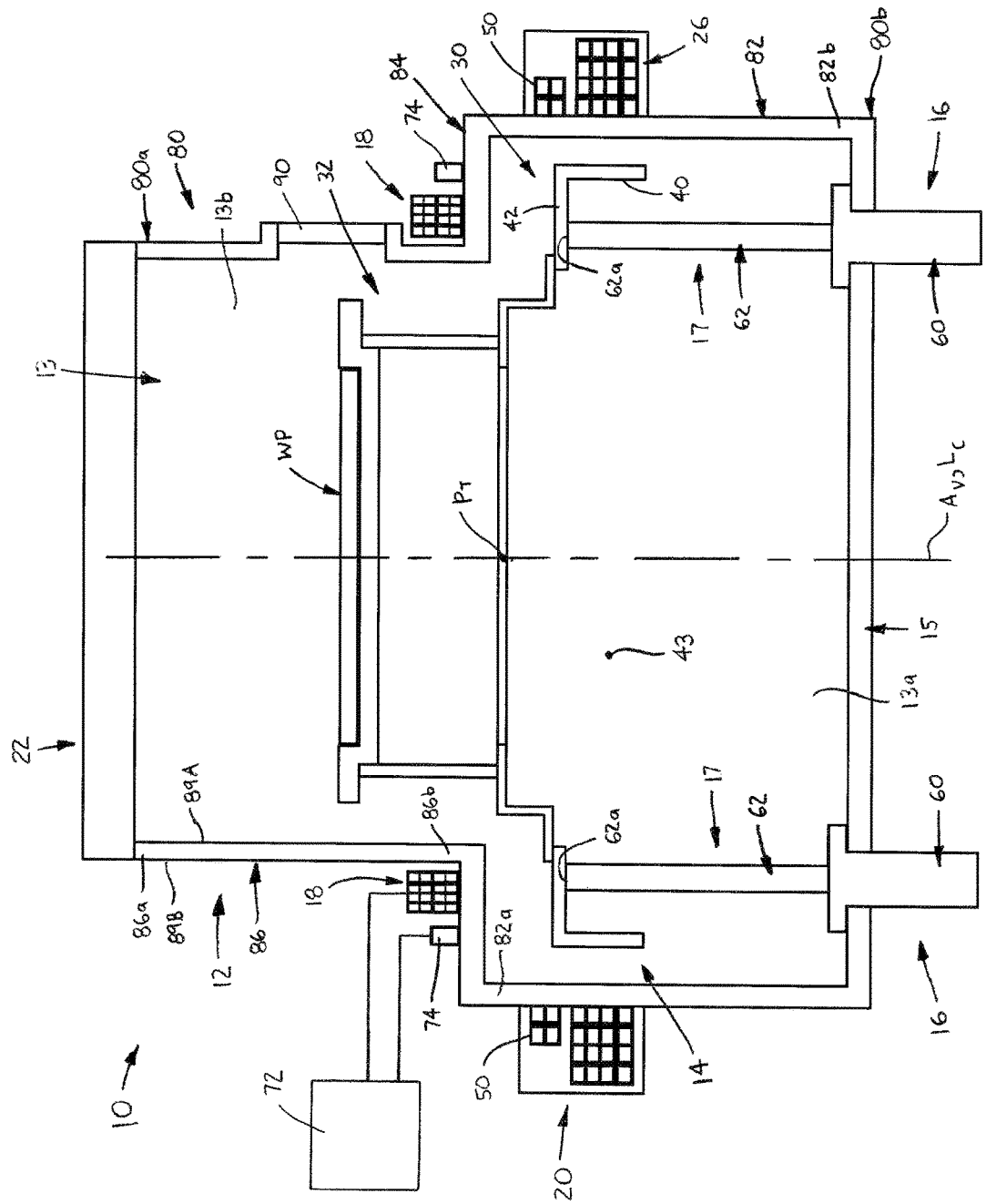
FIG. 2 is an axial cross-sectional view of the processing system shown with the rotor in a transfer position.
Figure 3:
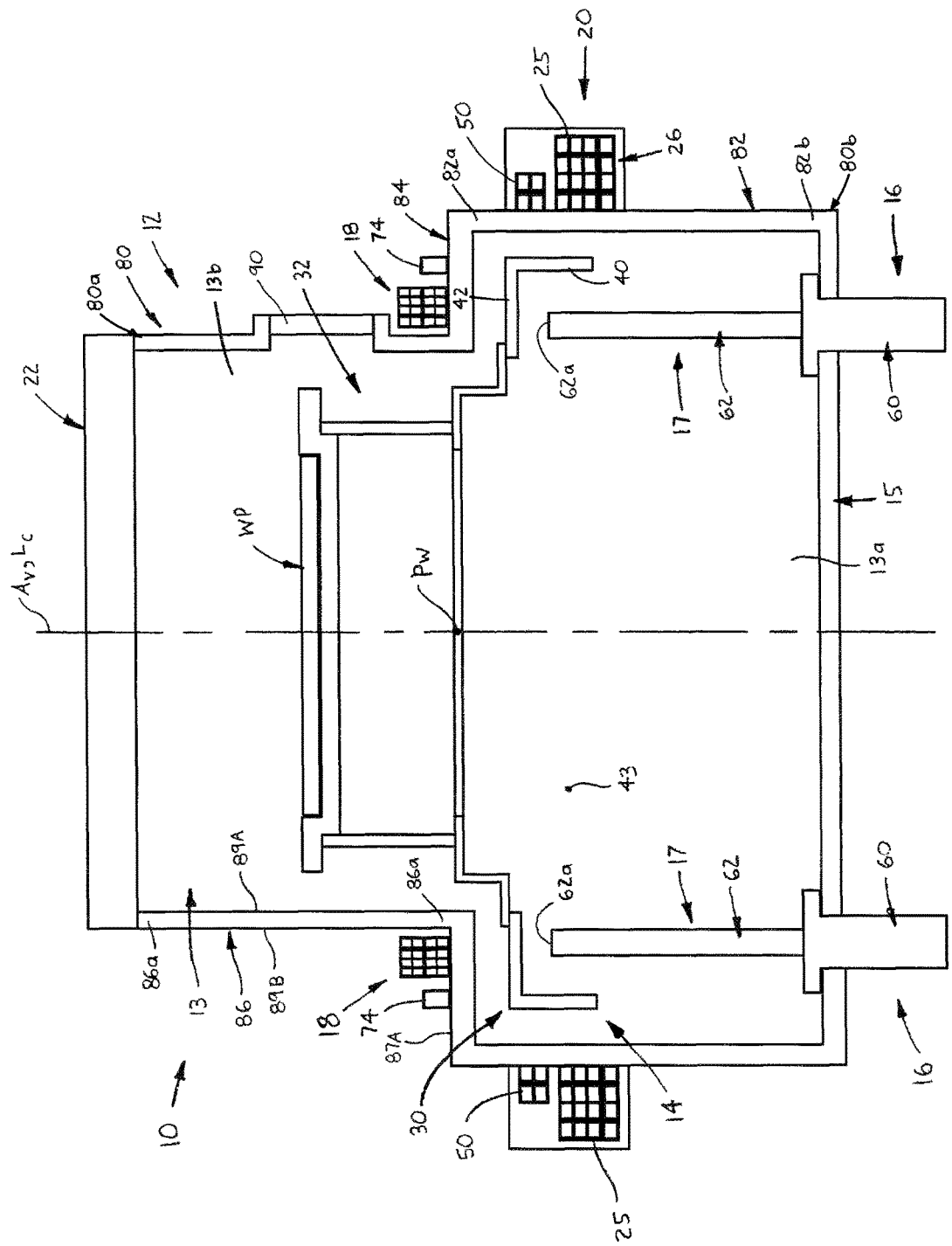
FIG. 3 is an axial cross-sectional view of the processing system shown with the rotor in a working position.

Referring to FIGS. 1-3, the processing system 10 preferably further comprises a controller 70 configured to operate the one or more lift actuators 16 and the one or more levitation actuators 18, generally as follows. To initiate a processing operation, the controller 70 activates the lift actuator(s) 16 such that each output member 62 displaces vertically upwardly to displace the rotor 14 vertically from the inactive vertical position $p_I$ (FIG. 1) to the transfer vertical position $p_T$ (FIG. 2). Preferably, the controller 70 also activates the levitation actuator(s) 18, simultaneously to, before or after activation of the lift actuator(s) 16, such that the rotor 14 is levitated off of the outer end 62a of the output member 62 to the working vertical position $p_W$ (FIG. 3). The levitation actuator(s) 18 maintain the rotor 14 at the working vertical position $p_W$, while the motor stator 26 angularly displaces the rotor 14, for the duration of the processing operation.

After completion of the processing operation, the controller 70 deactivates the at least one levitation actuator 18 such that the rotor 14 displaces vertically downwardly (i.e., due to gravity) from the working vertical position $p_W$ to the transfer vertical position $p_T$, such that the rotor 14 is then supported on the output member outer end(s) 62*a* of the one of more lift actuators 16. The controller 70 then operates each lift actuator 16 such that the output member(s) 62 displace vertically downwardly to displace the rotor 14 vertically from the transfer vertical position $p_T$ to the inactive vertical position $p_I$.

Referring to FIGS. 1-4, the processing system 10 preferably further comprises at least one vertical position sensor 74 disposed on the housing 12 and configured to sense the vertical position of the rotor 14. Preferably, the one or more sensors 74 are mounted on the housing radial section 84 so as to be spaced above, and configured to sense, the radial flange section 42 of the preferred rotor 14. However, the vertical position sensors 74 may be connected with any other portion of the housing 12 or/and located to sense any other portion of the rotor 14.

Figure 4:
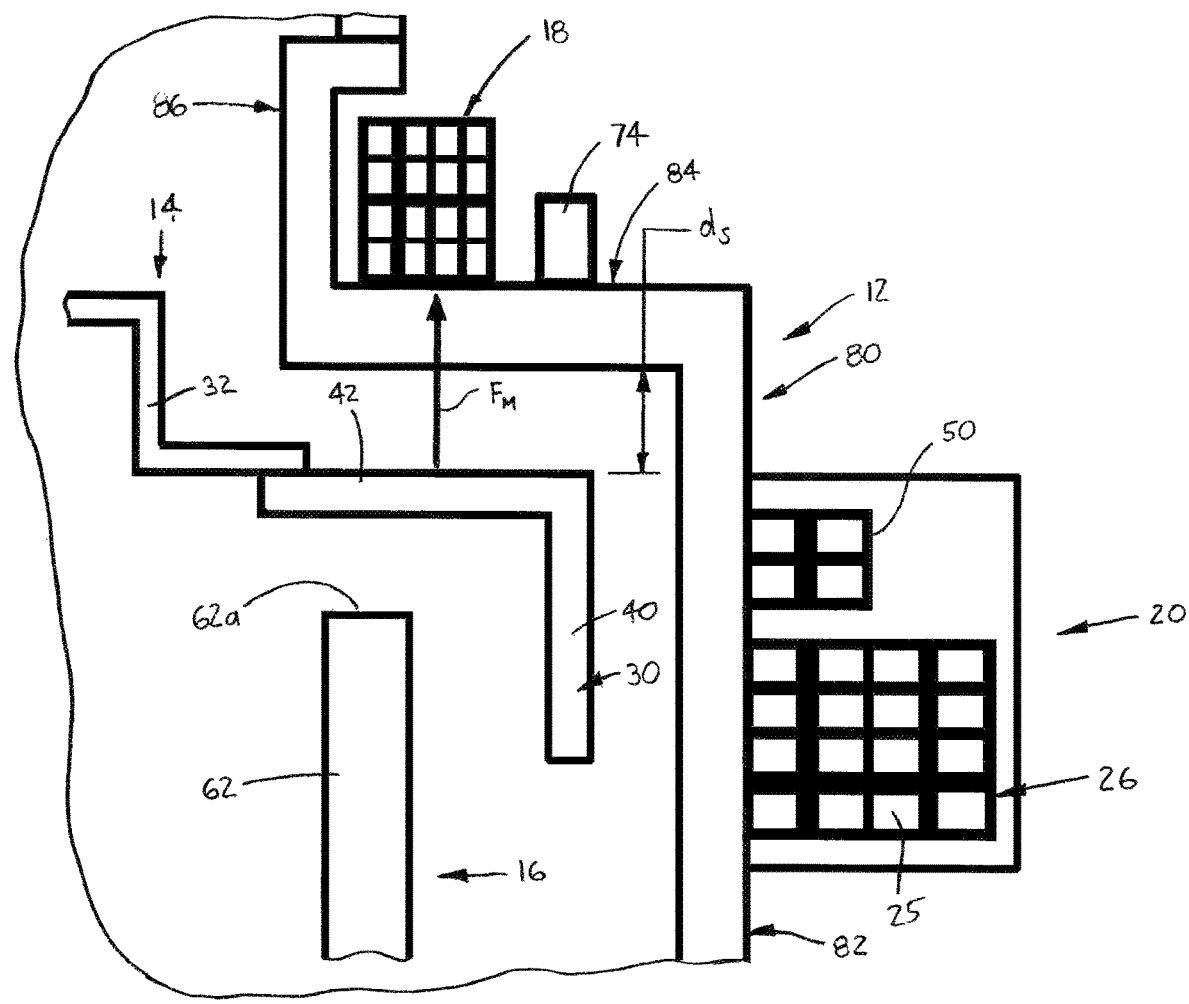
FIG. 4 is a broken-away, enlarged view of a portion of FIG. 3.

In any case, the sensor(s) 74 are coupled with the controller 70, or with another controller 72 (FIG. 2), and the controller 70 or 72 is configured to operate the levitation actuator 18 using the position information from the sensor(s) 74. Specifically, the controller 72 or 74 is preferably configured to maintain a predetermined spacing distance $d_S$ between the rotor 14, preferably the radial flange section 42, and the housing radial section 84, as indicated in FIG. 4. The particular controller 72 or 74 is preferably further configured to adjust the spacing $d_S$ when desired, such as by means of appropriate programming or a user input device (none depicted). Although separate controllers 58, 70 and 72 are described herein, the functionality of the separate controllers described above may be provided by a single controller (not shown) or any desired number of controllers. The present invention is in no manner limited to any specific control configuration and encompasses any and all control arrangements that provide the functionality described herein.

Referring now to FIGS. 1-3, 10 and 11, in a presently preferred embodiment, the housing 12 includes a generally cylindrical body 80 having an upper axial end 80*a* and a lower axial end 80*b*. The body 80 is preferably a single-stepped cylinder including a lower circular tubular section 82, a central radial section 84 and an upper circular tubular section 86. The lower tubular section 82 has upper and lower axial ends 82*a*, 82*b*, respectively, and inner and outer circumferential surfaces 83A, 83B, respectively. The inner circumferential surface 83A of the lower tubular section 82 defines a rotor section 13*a* of the interior chamber 13 and is sized to receive the rotor 14, the lower base wall 15 being connected with the lower axial end 82*b* of the lower tubular section 82 so as to seal the lower end of the cylindrical body 80, and thus the chamber 13. The central radial section 84 has an outer radial end 84*a* integrally connected with the upper axial end 82*a* of the lower tubular section 82, an inner radial end 84*b* and upper and lower surfaces 87A, 87B. The upper surface 87A provides a mounting surface for the levitation actuator(s) 18 and the vertical position sensor(s) 74.

Further, the upper circular tubular section 86 has an upper axial end 86*a*, a lower axial end 86*b* integrally connected with the inner radial end 84*b* of the central plate section 84 and inner and outer circumferential surfaces 89A, 89B. The inner circumferential surface 89A defines a working chamber section 13*b* of the housing chamber 13 and the upper axial end 18*a* is configured to support the processing tool 22. Furthermore, the upper tubular section has a sealable opening 90 sized to permit loading and loading of work pieces WP by means of the loader/unloader arm 24.

Although the stepped cylindrical housing as described above is presently preferred, the housing 12 may be formed in any other appropriate manner that enables the processing system to function generally as described herein. For example, the housing 12 may include one or more solid circular or rectangular blocks having at least one circular opening providing a counterbore chamber 13, an annular recess disposed about the counterbore chamber 13 for receiving the stator assembly 20, and one or more cylindrical openings extending axially above a radially-outer section of the counterbore chamber 13 and receiving the lift actuators 18 or the vertical position sensors 74. The present invention includes any appropriate structure of the housing 12 and is in no manner limited to any particular housing constructions.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A processing system for processing at least one work piece, the processing system comprising:
    a housing having an interior chamber and a central vertical axis extending through the interior chamber;
    a rotor disposed within the interior chamber of the housing and configured to support the at least one work piece;
    at least one lift actuator configured to linearly displace the rotor along the central vertical axis between a lower, inactive vertical position and an upper, transfer vertical position;
    at least one levitation actuator spaced above the rotor and configured to exert a magnetic pulling force on the rotor to levitate the rotor upwardly from the transfer vertical position to a working vertical position; and an annular stator assembly coupled with the housing, disposed about and spaced radially outwardly from the rotor and including a motor stator, the at least one lift actuator being configured to linearly displace the rotor vertically relative to the stator assembly.

2. The processing system as recited in claim 1 wherein the motor stator is configured to exert magnetic torque on the rotor when the rotor is at the working vertical position such that the rotor angularly displaces while the at least one levitation actuator maintains the rotor at the working vertical position.

3. The processing system as recited in claim 2 wherein:
the stator assembly further includes at least at least three radial actuators spaced apart circumferentially about the central vertical axis, each radial actuator being configured to exert a magnetic force on the rotor in a radial direction; and
the processing system further comprises at least one first radial position sensor configured to sense a position of the rotor along a first horizontal axis, at least one second radial position sensor configured to sense a position of the rotor along a second horizontal axis, and a controller coupled with the at least one first radial position sensor and with the at least one second radial position sensor and configured to operate the at least three radial actuators such that the rotor remains centered about the central axis when the rotor is at the working vertical position.

4. The processing system as recited in claim 1 wherein the at least one lift actuator includes at least three of the lift actuators spaced circumferentially about the central vertical axis.

5. The processing system as recited in claim 1 wherein the at least one lift actuator is disposed vertically below the rotor and has a movable output member contactable with the rotor.

6. The processing system as recited in claim 1 wherein the at least one lift actuator includes a base and an output member linearly displaceable relative to the base along an actuator axis, the actuator axis being parallel to or colinear with the central vertical axis, the output member having an outer end contactable with the rotor such that linear displacement of the output member vertically displaces the rotor.

7. The processing system as recited in claim 6 wherein the rotor includes a circular tubular section with upper and lower axial ends, the tubular section defining a bore, and a flange section extending radially inwardly from the upper end of the tubular section, the at least one lift actuator being located at least partially within the bore of the tubular section of the rotor such that the outer end of the output member of the at least one lift actuator is contactable with the flange section of the rotor.

8. The processing system as recited in claim 6 further comprising a controller configured to operate the at least one lift actuator such that the output member:
displaces vertically upwardly to displace the rotor vertically upwardly from the inactive vertical position to the transfer vertical position; or
displaces vertically downwardly to displace the rotor vertically downwardly from the transfer vertical position to the inactive vertical position.

9. The processing system as recited in claim 8 wherein:
the controller or another controller is configured to operate the at least one levitation actuator so as to:
activate the at least one levitation actuator such that the rotor is levitated off of the outer end of the output member to displace upwardly from the transfer vertical position to the working vertical position; and
deactivate the at least one levitation actuator such that the rotor displaces vertically downwardly from the working vertical position to the transfer vertical position so as to be supported on the outer end of the output member of the at least one lift actuator.

10. The processing system as recited in claim 1 wherein the rotor includes a circular body having a centerline coaxial with the central vertical axis of the housing, an outer perimeter and a plurality of magnetic material sections located at the outer perimeter and spaced circumferentially apart about the centerline, the motor stator being configured to exert magnetic force on each of the magnetic material sections to angularly displace the rotor about the central axis.

11. The processing system as recited in claim 10 wherein each magnetic material section of the rotor is an integral ferromagnetic portion of the rotor spaced from each circumferentially adjacent magnetic section by an air gap or a permanent magnet attached to a remainder of the rotor.

12. The processing system as recited in claim 1 wherein the rotor includes a circular base body magnetically engageable by the motor stator and a support mounted to the circular base body and configured to support the at least one work piece.

13. The processing system as recited in claim 1 further comprising a controller configured to activate the at least one levitation actuator after the at least one lift actuator has vertically displaced the rotor to the transfer vertical location such that the rotor is levitated off of the at least one lift actuator.

14. The processing system as recited in claim 1 wherein:
the housing includes a generally cylindrical body having a radial section and the at least one levitation actuator is mounted on the radial section of the cylindrical body of the housing so as to be spaced axially above the rotor; and
the processing system further comprises at least one vertical position sensor configured to sense a vertical position of the rotor and a controller coupled with the at least one vertical position sensor and configured to operate the at least one levitation actuator such that the rotor remains levitated at the working position.

15. The processing system as recited in claim 14 wherein the at least one levitation actuator includes a plurality of the levitation actuators spaced circumferentially about the central vertical axis, each one of the levitation actuators being mounted on the radial section of the cylindrical body so as to be spaced axially above the rotor and the at least one vertical position sensor includes a plurality of vertical position sensors spaced circumferentially about the central vertical axis, the controller being coupled with the plurality of vertical position sensors and configured to operate each one of the plurality of levitation actuators.

16. The processing system as recited in claim 15 wherein:
the stator assembly further includes at least at least three radial actuators spaced apart circumferentially about the central vertical axis, each radial actuator being configured to exert a magnetic force on the rotor in a radial direction;
the processing system further comprises at least one first radial position sensor configured to sense a position of the rotor along a first horizontal axis and at least one second radial position sensor configured to sense a position of the rotor along a second horizontal axis, the controller is configured to operate the at levitation actuators and the radial actuators to maintain a predetermined spacing distance between the rotor and the vertical position sensors and the radial position sensors, the controller being configured to adjust the spacing distance.

17. The processing system as recited in claim 1 wherein:
the housing includes a lower circular tubular section with upper and lower axial ends, a central section with an outer radial end connected with the upper axial end of the lower tubular section and an inner radial end, and an upper circular tubular section having a lower axial end connected with the inner radial end of the central plate section; and
the rotor includes a circular tubular section with upper and lower axial ends and a flange section extending radially inwardly from the upper end of the tubular section, the tubular section of the rotor being disposed within the lower tubular section of the housing and the flange section of the rotor being spaced axially below the central section of the housing;
the at least one levitation actuator is mounted to the central section of the housing so as to be spaced axially above the radial flange section of the rotor and is configured to exert the magnetic pulling force on the rotor such that rotor remains spaced from the base surface when the rotor angularly displaces about the central axis; and
the at least one lift actuator includes a linearly displaceable output member having an upper end contactable with the radial flange section of the rotor such that the output member displaces the rotor vertically upwardly from the inactive position to the transfer position and alternatively displaces the rotor vertically downwardly from the transfer position to the inactive position.

18. The processing assembly as recited in claim 1 further comprising:
an arm configured to insert the at least one work piece into the housing chamber and to load the work piece onto the rotor and to alternatively unload the at least one work piece from the rotor and remove the work piece from the housing chamber; and
a processing tool configured to process the at least one work piece.

19. A processing system for processing at least one work piece, the processing system comprising:
a housing having an interior chamber and a central vertical axis extending through the interior chamber;
a rotor disposed within the interior chamber of the housing and configured to support the at least one work piece;
at least one lift actuator spaced vertically below the rotor and having a movable output member contactable with the rotor and configured to linearly displace the rotor along the central vertical axis between a lower, inactive vertical position and an upper, transfer vertical position;
at least one levitation actuator disposed above the rotor and configured to exert a magnetic pulling force on the rotor to levitate the rotor upwardly from the transfer vertical position to a working vertical position; and
an annular stator assembly disposed about and spaced radially outwardly from the rotor and including a motor stator configured to exert magnetic torque on the rotor when the rotor is at the working vertical position such that the rotor angularly displaces about the central vertical axis while the at least one levitation actuator maintains the rotor at the working vertical position.

20. The processing system as recited in claim 19 further comprising a controller configured to operate the at least one lift actuator and the at least one levitation actuator such that:
the output member of the lift actuator displaces vertically upwardly to displace the rotor vertically upwardly from the inactive vertical position to the transfer vertical position or displaces vertically downwardly to displace the rotor vertically downwardly from the transfer vertical position to the inactive vertical position; and
the at least one levitation actuator is activated such that the rotor is levitated off of the outer end of the output member to displace upwardly from the transfer vertical position to the working vertical position and the at least one levitation actuator is alternatively deactivated such that the rotor displaces vertically downwardly from the working vertical position to the transfer vertical position so as to be supported on the outer end of the output member of the at least one lift actuator.

* * * * *